US007380011B2

(12) United States Patent
Li et al.

(10) Patent No.: US 7,380,011 B2
(45) Date of Patent: May 27, 2008

(54) METHODS AND SYSTEMS FOR PER-SESSION NETWORK ADDRESS TRANSLATION (NAT) LEARNING AND FIREWALL FILTERING IN MEDIA GATEWAY

(75) Inventors: San-Qi Li, Plano, TX (US); Weijun Lee, Plano, TX (US); David Z. Lu, Dallas, TX (US)

(73) Assignee: Santera Systems, Inc., Plano, TX (US)

( * ) Notice: Subject to any disclaimer, the term of this patent is extended or adjusted under 35 U.S.C. 154(b) by 816 days.

(21) Appl. No.: 10/676,240

(22) Filed: Oct. 1, 2003

(65) Prior Publication Data
US 2005/0076108 A1    Apr. 7, 2005

(51) Int. Cl.
G06F 15/16    (2006.01)
(52) U.S. Cl. .................. 709/227; 726/11; 370/352; 370/389; 370/488
(58) Field of Classification Search ........... 709/205, 709/227, 217, 223, 231, 245; 370/352, 389, 370/393, 401; 713/201, 151, 160; 379/93.07; 725/119; 726/5, 11
See application file for complete search history.

(56) References Cited

U.S. PATENT DOCUMENTS

| | | | |
|---|---|---|---|
| 6,674,758 B2 | 1/2004 | Watson | |
| 6,910,074 B1 * | 6/2005 | Amin et al. | 709/227 |
| 7,107,360 B1 | 9/2006 | Phadnis et al. | |
| 7,143,137 B2 * | 11/2006 | Maufer et al. | 709/205 |
| 2003/0106067 A1 * | 6/2003 | Hoskins et al. | 725/119 |
| 2003/0212999 A1 * | 11/2003 | Cai | 725/119 |
| 2003/0227905 A1 * | 12/2003 | Bouleros et al. | 370/352 |
| 2004/0128554 A1 * | 7/2004 | Maher et al. | 713/201 |
| 2004/0131165 A1 * | 7/2004 | Ebisawa et al. | 379/93.07 |
| 2005/0117605 A1 | 6/2005 | Yan et al. | |
| 2006/0052130 A1 | 3/2006 | Choski | |

OTHER PUBLICATIONS

International Search Report and Written Opinion of the International Searching Authority corresponding to PCT application No. PCT/US04/32272 dated Oct. 23, 2006.

* cited by examiner

Primary Examiner—Dustin Nguyen
(74) Attorney, Agent, or Firm—Jenkins, Wilson, Taylor & Hunt, P.A.

(57) ABSTRACT

Methods and systems for per-session NAT learning and firewall filtering are disclosed. Media packets associated with a call/session are received and processed at a media gateway. For the first few received media packets associated with a session, the media gateway uses various unique methods to learn the actual source IP address and UDP port assigned to the remote communication terminal by its customer-premises Network Address Translators (NATs) to the media flows of the current session. After the remote IP and UDP are learned, the media gateway reconfigures its firewall filtering function to check both the dynamically learned remote IP and UDP and the locally assigned IP and UDP of the current session. The per-session NAT learning function removes reachability issues in VoIP deployment, and the per-session firewall filtering function enhances security protection in VoIP deployment.

50 Claims, 16 Drawing Sheets

METHODS AND SYSTEMS FOR PER-SESSION NETWORK ADDRESS TRANSLATION (NAT) LEARNING AND FIREWALL FILTERING IN MEDIA GATEWAY

TECHNICAL FIELD

The present invention includes methods and systems for NAT learning and firewall filtering. More particularly, the present invention includes methods and systems for per-session NAT learning and firewall filtering in a media gateway.

RELATED ART

In modern telecommunications networks, media gateways are used to connect telephony calls (also known as sessions) between various types of communications terminals. These communications terminals may be packet-based communications terminals or traditional TDM communications terminals. Media gateways perform media format translation functions so that the media streams delivered to the various types of communications terminals are in the proper formats.

Media gateways are controlled by network entities referred to as media gateway controllers (MGC), commonly referred to as soft switches. Soft switches perform call signaling functions to establish sessions between communications terminals via one or more media gateways. Soft switches communicate with media gateways via one or more gateway control protocols, such as MEGACO or MGCP.

In order to conserve public IP addresses and to increase security in packet-based communications networks, many service providers and other organizations have adopted private IP address within their networks and introduced firewalls and network address translators (NATs) to interface the external networks. Firewalls and NATs are often combined one device but they perform logically different functions. Firewalls prevent unauthorized packets from entering a network. NATs translate the source IP addresses in a packet from one IP address space to another. Network address translation may also include translating the source ports (e.g. UDP and TCP) in outgoing IP packets. Exemplary proposals for network address translation appear in IETF RFC 2263 and RFC 3022, the disclosures of each of which are incorporated herein by reference in their entirety.

One problem with network address translation in a voice-over-IP communications network is that there may be no way to know in advance what IP address and UDP ports will appear in the source IP/UDP address fields of the media packets in a voice-over-IP media stream. More specifically, the call setup messages used to set up a media session with a media gateway may contain the locally-assigned private address (IP and UDP) of a user's communications terminal, but this source address is only meaningful within the private IP address domain of the end user and is useless to the media gateway, which is in the service provider's IP address domain. Only the final IP and UDP addresses (statically or dynamically) translated by the customer-premises NATs at the run time are meaningful to the media gateway. However, this final NAT-translated address cannot be determined before the media packets actually pass through the customer-premises NATs. As a result, the source communications terminal behind the customer-premises NATs does not have a fixed known address for media flows. This creates a reachability problem for voice-over-IP calls.

In order to overcome this reachability problem, some voice-over-IP networks include external session controllers that learn IP and UDP addresses and perform firewall filtering on behalf of a media gateway and a soft switch. FIG. 1 illustrates this conventional configuration. In FIG. 1, a stand-alone session controller 100 learns IP addresses of terminals 102, 104, and 106 behind customer-premises NATs 108 and 110. Session controller 100 is external to soft switch 112 and media gateway 114. Media gateway 114 allows any-to-any interconnections between all types of PSTN terminals 116.

In operation, when receiving call setup messages from terminals 102, 104, and 106, session controller 100 always allocates resources for the session even if the call may subsequently be blocked by soft switch 112 during call processing. Such resource allocation is inefficient. In addition, because session controller 100 must perform NAT learning in order to route packets for a session, all calls (including intra-IP-domain calls) must go through session controller 100. Yet another problem with the configuration illustrated in FIG. 1 is that because session controller 100 handles both call signaling messages and media stream packets for NAT learning and firewall filtering functions, the processing load on session controller 100 is often high, and consequently, the architecture illustrated in FIG. 1 is not scalable.

Thus, there exists a long felt need for improved methods and systems for performing NAT learning and firewall filtering on a per-session basis.

DISCLOSURE OF THE INVENTION

The present invention includes improved methods and systems for per-session NAT learning and firewall filtering. In one exemplary implementation, NAT learning and per-session firewall filtering functions are implemented in a media gateway. The media gateway receives a call setup request from a soft switch. In response to the call setup request, the media gateway or the soft switch allocates local processing resources, local IP and UDP addresses, and signals to the remote terminal. The remote terminal sends the media packets to the local IP and UDP address combination. However, because the media packets originate from behind a NAT, the dynamically assigned source IP address in these received media packets is originally unknown to the media gateway. The media gateway then learns the dynamically assigned source IP address and source UDP port from the first media packet or first few media packets. After learning the source IP address and source UDP port, the media gateway accepts subsequent media stream packets addressed to the local <IP, UDP> address combination and from the learned remote source <IP, UDP> address combination. Any packets that do not exactly match the <local IP, local UDP, learned remote IP, learned remote UDP> address combination will be rejected. Because the <local IP, local UDP, learned remote IP, learned remote UDP> address combination is dynamically created in each call (session), it is almost impossible for any outside malicious attackers to guess the right IP addresses and UDP ports to spoof the media gateway. This achieves a very high level of network security.

Accordingly, it is an object of the invention to provide methods and systems for per-session NAT learning and firewall filtering.

It is another object of the invention to provide methods and systems for providing per-session NAT learning and firewall filtering in a media gateway without requiring an external session controller.

Some of the objects of the invention having been stated hereinabove and are addressed in whole or in part by the present invention; other objects will become evident as the description proceeds when taken in connection with the accompanying drawings as best described herein below.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
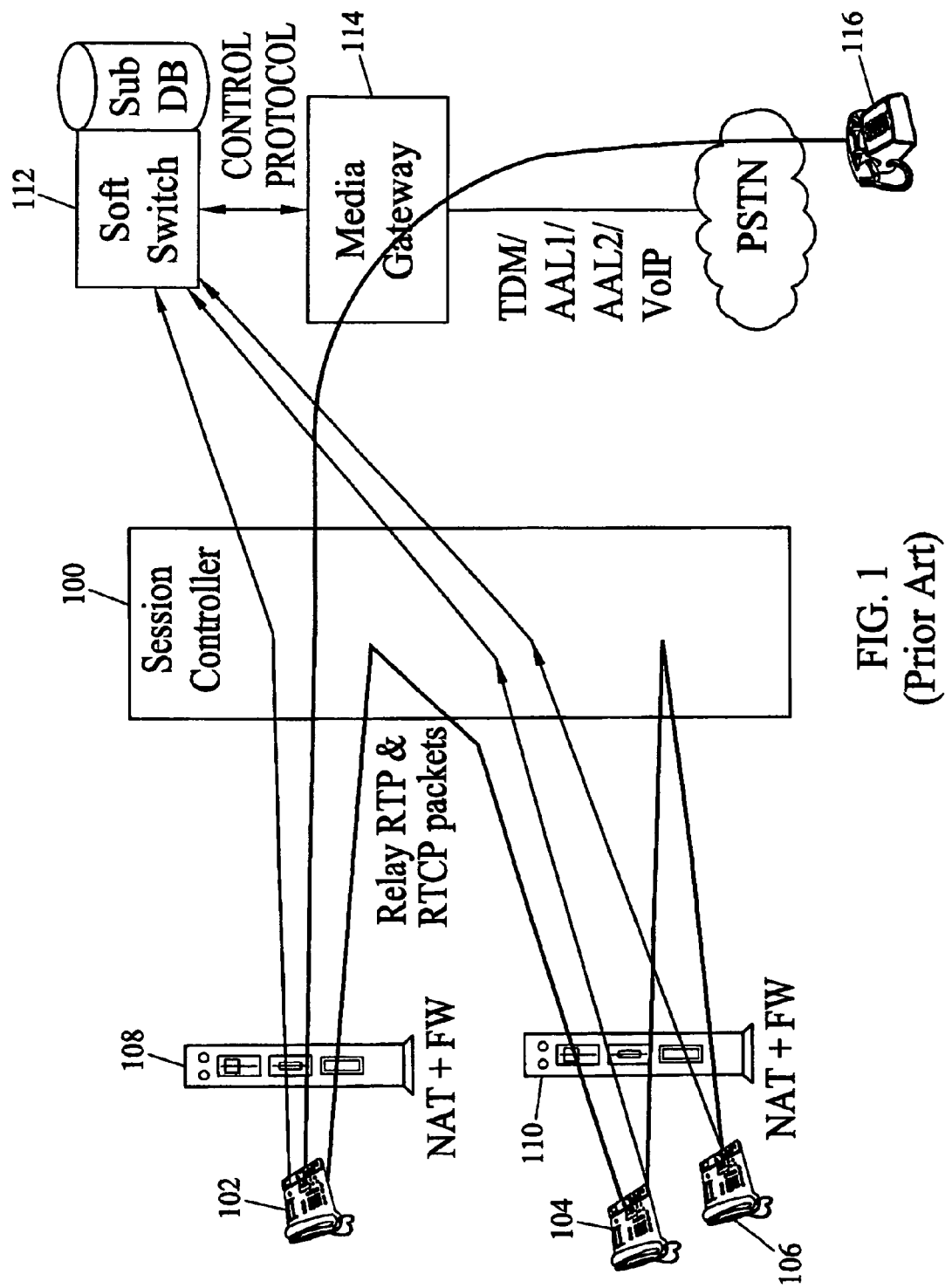
FIG. 1 is a block diagram of a conventional network with an external session controller according to an embodiment of the present invention.
Figure 2:
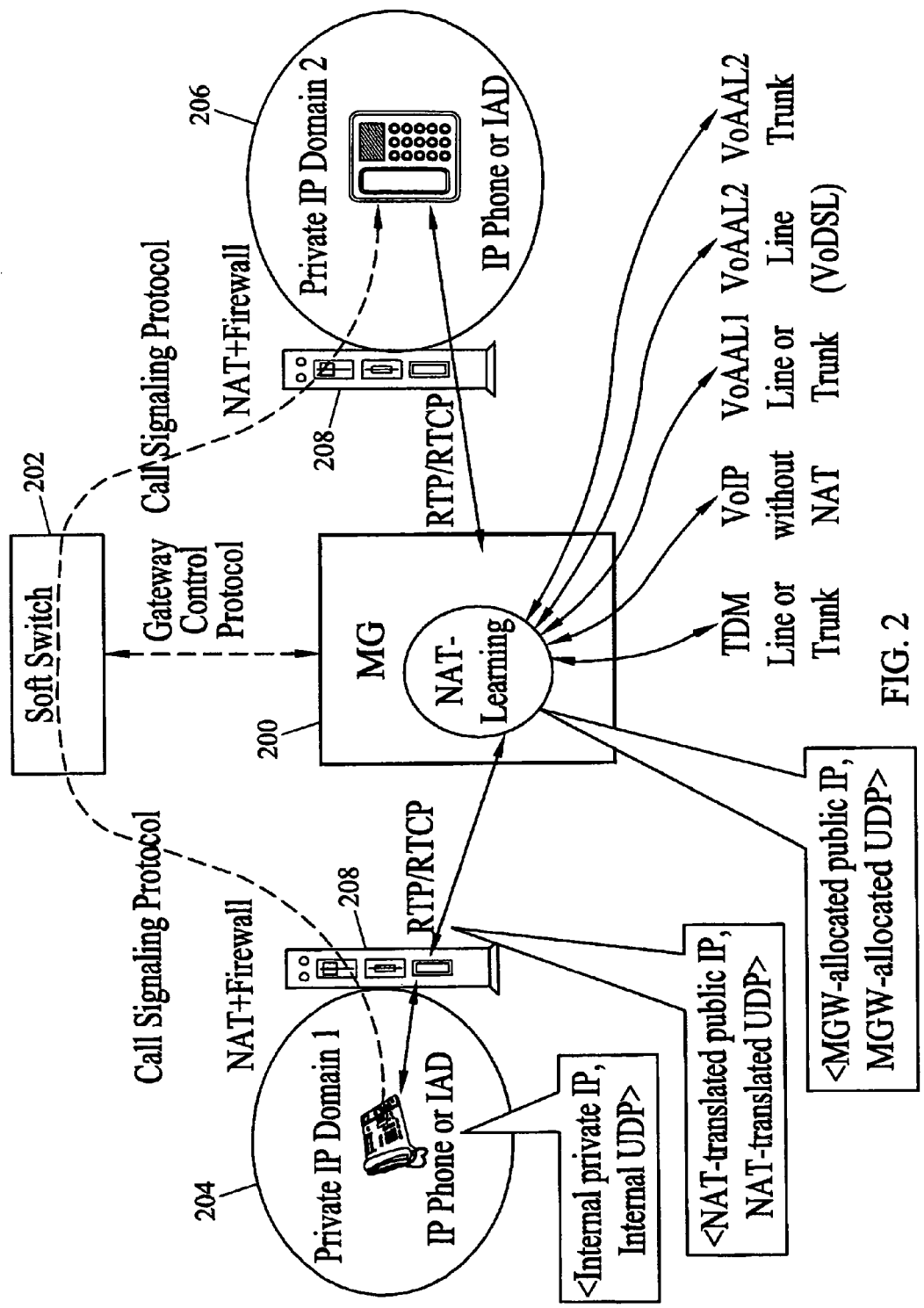
FIG. 2 is a network diagram illustrating a media gateway with integrated per-session NAT learning and firewall filtering functionality according to an embodiment of the present invention.

As described above, the present invention includes a media gateway including integrated NAT learning and firewall filtering on a per-session basis. FIG. 2 is a network diagram illustrating a media gateway with integrated NAT learning and firewall filtering according to an embodiment of the present invention. Referring to FIG. 2, media gateway 200 and soft switch 202 communicate with each other via a media gateway control protocol to establish, maintain, and tear down calls. Typical calls may originate from packet networks or TDM networks. In the illustrated example, calls originating from a first private IP domain 204 may terminate at a second private IP domain 206 or at a TDM, VoAAL1, VoDSL, or VoIP line or trunk. Each of the private IP domains 204 and 206 may interface with the core IP network via a local network address translator 208 with optional firewall filtering functions. Network address translators 208 hide IP addresses in private IP domains 204 and 206 and translate the source addresses in outgoing packets to routable public IP addresses. Accordingly, media gateway 200 is preferably configured to perform NAT learning for the bearer channel path and soft switch 202 is preferably configured to perform NAT learning for the signaling path associated with each session. Details of the NAT learning functionality of media gateway 200 and soft switch 202 will be described below.

Figure 3:
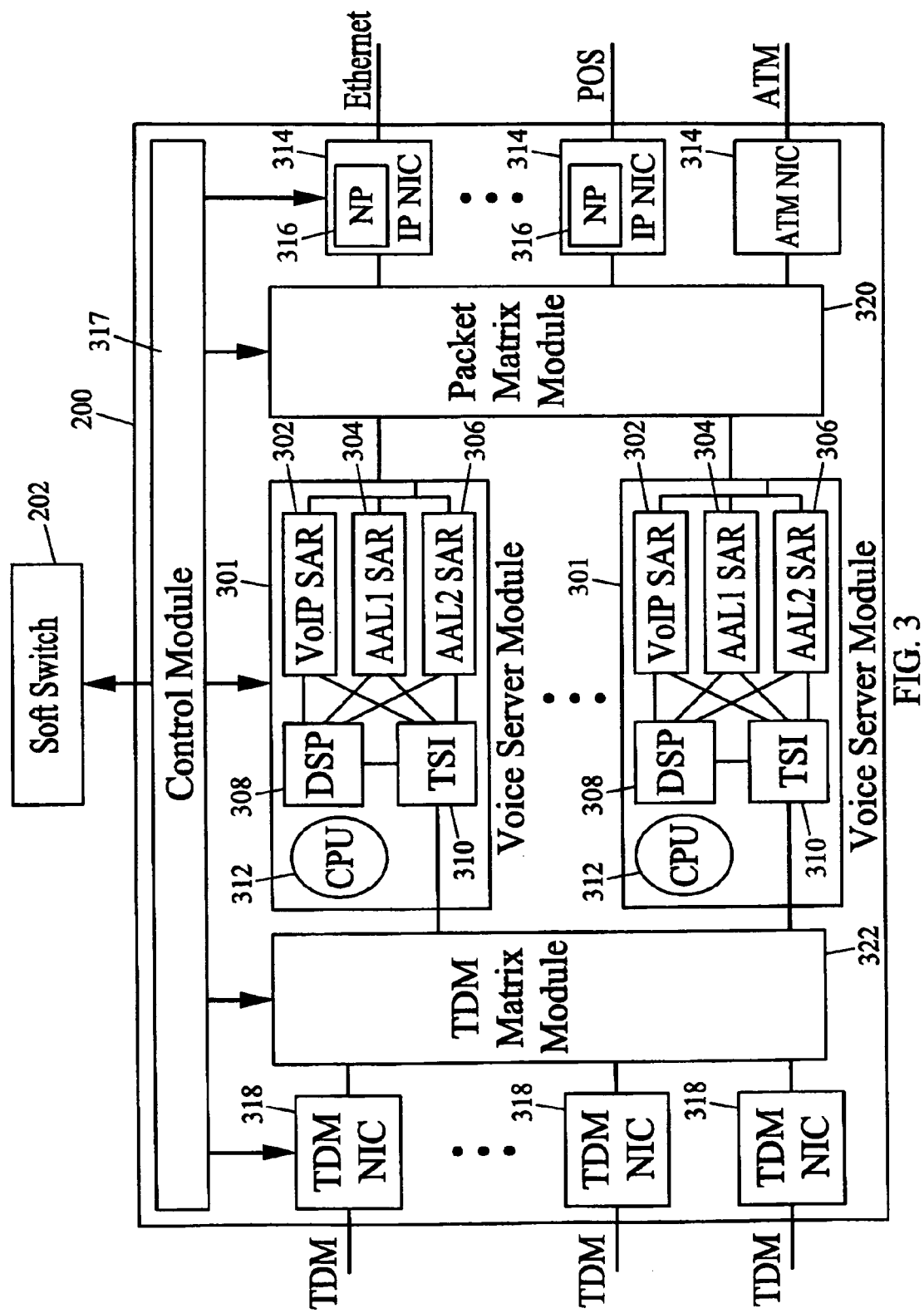
FIG. 3 is a block diagram illustrating an exemplary internal architecture for a media gateway with an integrated NAT learning and firewall filtering function according to an embodiment of the present invention.

FIG. 3 is a block diagram illustrating an exemplary internal architecture of media gateway 200. In FIG. 3, media gateway 200 includes voice server modules 301. Each voice server module 301 may include voice-over-IP SAR chips 302, AAL1 SAR chips 304, and AAL2 SAR chips 306. In addition, each voice server module 301 includes a digital signal processor (DSP) 308, a time slot inter-exchange (TSI) sub-module 310, and a central processing unit (CPU) 312.

In the illustrated example, voice-over-IP SAR chip 302 implements one or more packet-over-IP protocols, such as Real-time Transmission Protocol (RTP). AAL1 SAR chip 304 implements ATM Adaptation Layer 1 (AAL1) functions. AAL2 SAR chip 306 implements ATM Adaptation Layer 2 (AAL2) functions. The functions of SAR chips 302, 304, and 306 may be combined into a single chip without departing from the scope of the invention. DSP 308 performs transcoding, echo cancellation, and other media processing functions.

TSI sub-module 310 controls communication paths from/to TDM matrix module 322 to/from DSP 308 and various SAR chips 302, 304, and 306. CPU 312 controls the overall operation of each voice server module 301. In addition to voice server modules 301, media gateway 200 includes a plurality of network interface cards 314 including network processors 316. Each network interface card implements some network-layer packet forwarding functions, such as IP packet forwarding functions. In the illustrated example, different types of network interface cards, including Ethernet, Packet over Sonet (POS), and ATM NICs, are included in the media gateway to connect to external networks. Although in FIG. 3, only the IP NICs include network processors, a network processor may also be included on the ATM NIC without departing from the scope of the invention.

A control module 317 controls the overall operations of media gateway 200. For example, control module 317 may control voice server resource allocation in media gateway 200. TDM NICs 318 interface with external TDM networks. A TDM matrix module 322 provides internal communications paths between TDM NICs 318 and voice server modules 301.

Figure 4:
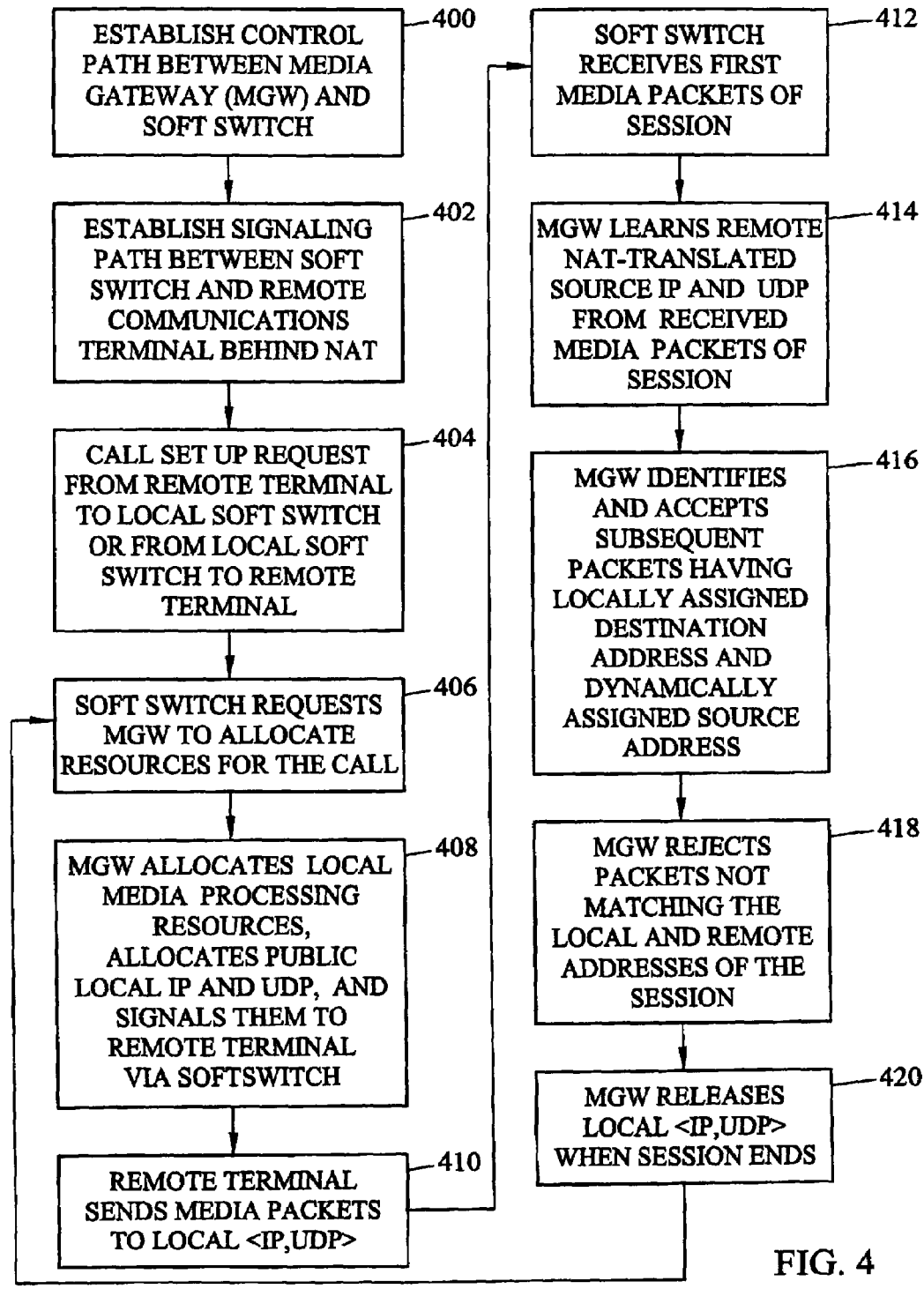
FIG. 4 is a flow chart illustrating exemplary steps that may be performed by a media gateway in performing per-session NAT learning according to an embodiment of the present invention.

FIG. 4 is a flow chart illustrating exemplary steps that may be performed by media gateway 200 in implementing per-session NAT learning according to an embodiment of the invention. Referring to FIG. 4, in step 400, a control path is established between media gateway 200 and soft switch 1202. The control path may be a TCP or UDP connection and may utilize any suitable media gateway control protocol, such as MGCP or MEGACO. In step 402, a signaling path is established between soft switch 202 and a remote communications terminal behind its local NAT. The signaling path may utilize any suitable call signaling protocol, such as SIP, H.323, ISUP, BICC, MGCP or MEGACO. In step 404, either a remote or a local communications terminal requests call setup. For example, if the call signaling protocol is SIP, and a remote communications terminal is requesting call setup, step 404 may include the remote communications terminal sending an INVITE message to soft switch 202.

In step 406, soft switch 202 requests that media gateway 200 allocate resources for the call. This step may include sending a media gateway control protocol command to media gateway 200 for requesting call setup. Soft switch 202 may also utilize the first received call setup message to learn the source address dynamically assigned to the remote telecommunications equipment performing the call setup signaling. For example, soft switch 202 may extract the source network and source transport addresses from the first call setup message and store these addresses in a table. Soft switch 202 may then accept subsequent call setup messages from the NAT-translated source addresses and reject call setup messages without the dynamically learned source addresses. In this manner, soft switch 202 may perform per-session NAT learning and firewall filtering for the signaling paths.

In step 408, in response to the request for allocation of resources for the call, media gateway 200 assigns a local <IP, UDP> address combination for the session, and informs the remote terminal of the local <IP, UDP> address combination via soft switch 202. Without departing from the scope of the invention, the local IP address and UDP port may also be assigned by the softswitch 202 and then given to the media gateway via any gateway control protocol. In addition to local IP and UDP, media gateway 200 assigns other local media processing resources, including assigning a voice SAR chip for processing the call. The local <IP, UDP> address combination will be served by the assigned voice SAR chip. The local <IP, UDP> address combination is preferably multicast to all of the NICs so that the NICs will know how to route incoming media packets for the session.

In step 410, the remote terminal associated with the session sends media packets to the local <IP, UDP> address combination. In step 412, media gateway 200 receives the first few media packets for the session. Since the media packets originate from behind a network address translator (NAT), the NAT-translated source address of the media packets is not known in advance to media gateway 200. Accordingly, in step 414, media gateway 200 learns the NAT-translated source addresses of the media packet. Learning the NAT-translated source address for the session packet may include extracting the source IP address and/or source UDP port from the packet, associating the learned IP and UDP combination with the session, and storing the combination for identifying valid subsequent packets of the session. Different methods for performing this association and processing subsequent packets will be described in detail below.

Once the NAT-translated source address has been learned, in step 416, media gateway 200 identifies and accepts subsequent packets having the locally assigned destination address and the NAT-learned remote address. As indicated above, media gateway 200 may use both the local <IP, UDP> address combination assigned to the session and the dynamically learned remote <IP, UDP> address combination in order to identify session packets. Utilizing the combination of <local IP, local UDP, remote IP, and remote UDP> addresses to identify sessions enhances security on a per-session basis. In step 418, media gateway 200 rejects packets not matching the addresses assigned to a session. In step 420, media gateway 200 releases the local <IP, UDP> address combination assigned to a session when the call/session ends.

Steps 406-420 are repeated for each session so that NAT learning and firewall filtering are performed on a per-session basis. Because resources are not allocated until a session is established, this solution provides enhanced scalability over conventional external session controller implementations. In addition, because the <local IP, local UDP, learned remote IP, learned remote UDP> address combination is dynamically created in each call (session), it is almost impossible for any outside malicious attackers to guess the right IP packets to spoof the media gateway. This achieves a very high level of network security.

Figure 5:
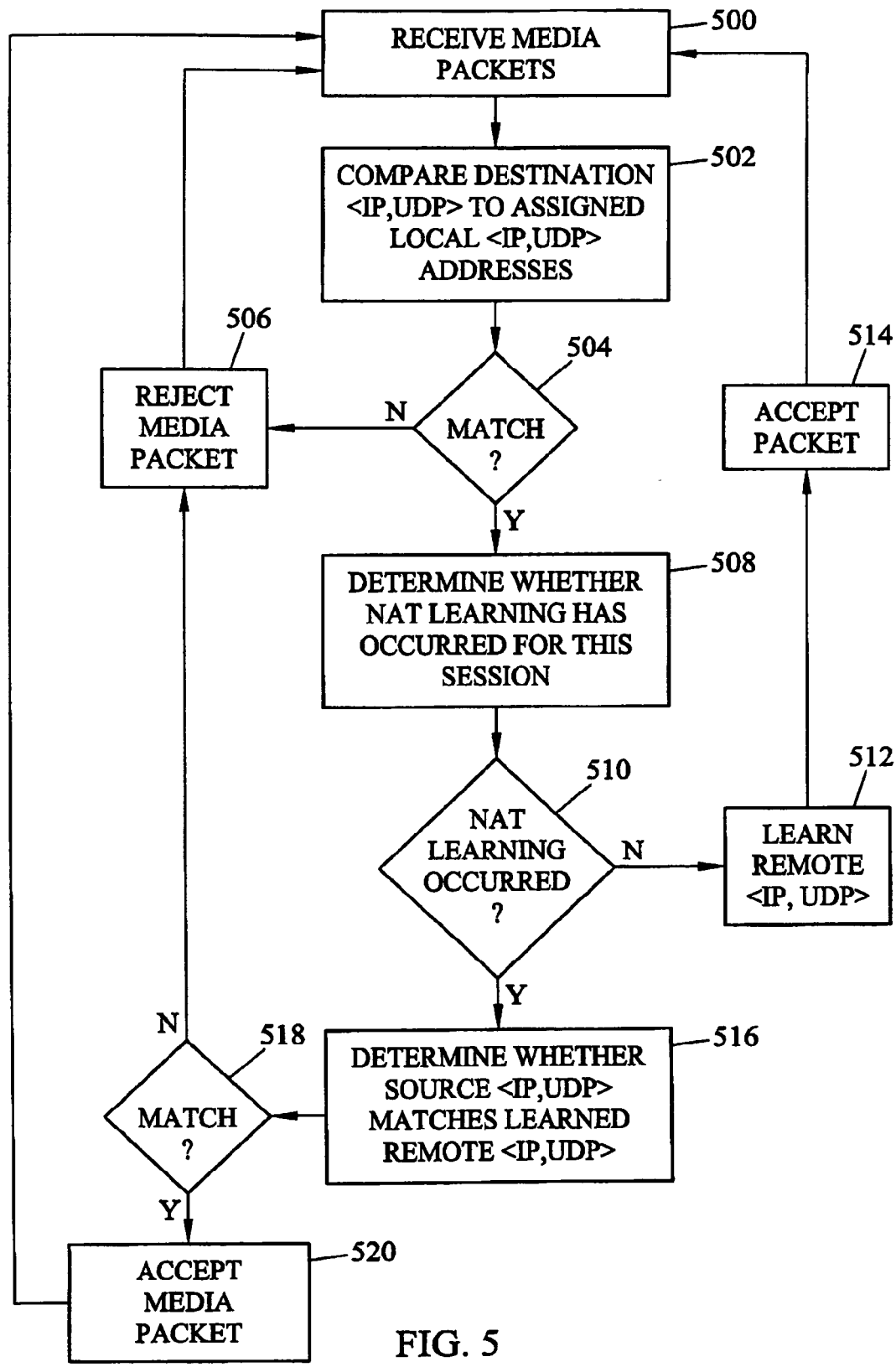
FIG. 5 is a flow chart illustrating exemplary steps that may be performed by a media gateway in performing per-session firewall filtering according to an embodiment of the present invention.

FIG. 5 is a flow chart illustrating exemplary firewall filtering on a per-session basis according to an embodiment of the present invention. Referring to FIG. 5, in step 500, media gateway 200 receives media packets. In step 502, media gateway 200 compares the destination <IP, UDP> address combination to each local <IP, UDP> address combination for active sessions. In step 504, if the destination <IP, UDP> address combination in the received media packet does not match any of the <IP, UDP> address combinations assigned to active sessions, control proceeds to step 506 where the media packet is rejected. Thus, before a session is established via a signaling protocol, unauthorized packets that are not addressed to any of the locally allocated <IP, UDP> address combinations are rejected.

In step 504, if the destination <IP, UDP> address combination in a received media packet matches one of the local <IP, UDP> address combinations, control proceeds to step 508 where media gateway 200 determines whether NAT learning has occurred for the particular session. Step 508 may include determining whether a remote <IP, UDP> address combination is present in the session table corresponding to the local <IP, UDP> address combination. In step 510, if NAT learning has not occurred, control proceeds to step 512 where the remote <IP, UDP> address combination is learned and to step 514 where the packet is accepted. Control then returns to step 500 where media gateway 200 receives new media packets.

In step 510, if NAT learning has occurred for the session, control proceeds to step 516 where media gateway 200 determines whether the source <IP, UDP> address combination in a packet matches the learned remote <IP, UDP> address combination assigned to the session. In step 518, if the source <IP, UDP> address combination matches the learned remote <IP, UDP> address combination, control proceeds to step 520 where the media packet is accepted. If, in step 518, the source <IP, UDP> address combination does not match the learned remote <IP, UDP> address combination, control proceeds to step 506 where the media packet is rejected.

Thus, as illustrated in FIG. 5, a media gateway 200 of the present invention performs firewall filtering on a per-session basis. Initially, if no local <IP, UDP> address combination has been assigned when a media packet arrives, the packet is rejected. This level of filtering prevents unauthorized packets for which no session has been established from accessing media gateway resources. Once a local <IP, UDP> address combination has been assigned, packets addressed to the local <IP, UDP> address combination are accepted while the NAT learning process is occurring. In addition, because NAT learning is internal to media gateway 200, per-session vulnerability to attack ends on the order of milliseconds after the first packet in a media stream is received.

Once NAT learning occurs, packets for the session must match both the local and remote IP and UDP addresses for the session. Reconfiguring the firewall filtering function after the remote <IP, UDP> address combination for a session has been learned greatly enhances security over conventional firewall implementations that do not use learned <IP, UDP> address combinations for firewall filtering. Once a session is terminated, the local <IP, UDP> address combination for the session will be released and packets addressed to that local <IP, UDP> address combination will be rejected until that combination is reassigned to a new session.

Per-session NAT learning and firewall filtering may be performed for a number of call types and at a number of locations within media gateway 200. One advantage provided by the present invention over conventional session-controller-based NAT learning is that the NAT learning in media gateway 200 is distributed among multiple processors. That is, when a new session is established, the NAT learning for each new session is preferably performed by a processing resource assigned from a shared pool of processing resources. Using distributed NAT learning increases scalability and decreases the potential impact of a processor failure on NAT learning functionality over conventional session-controller-based NAT learning implementations.

Figure 6:
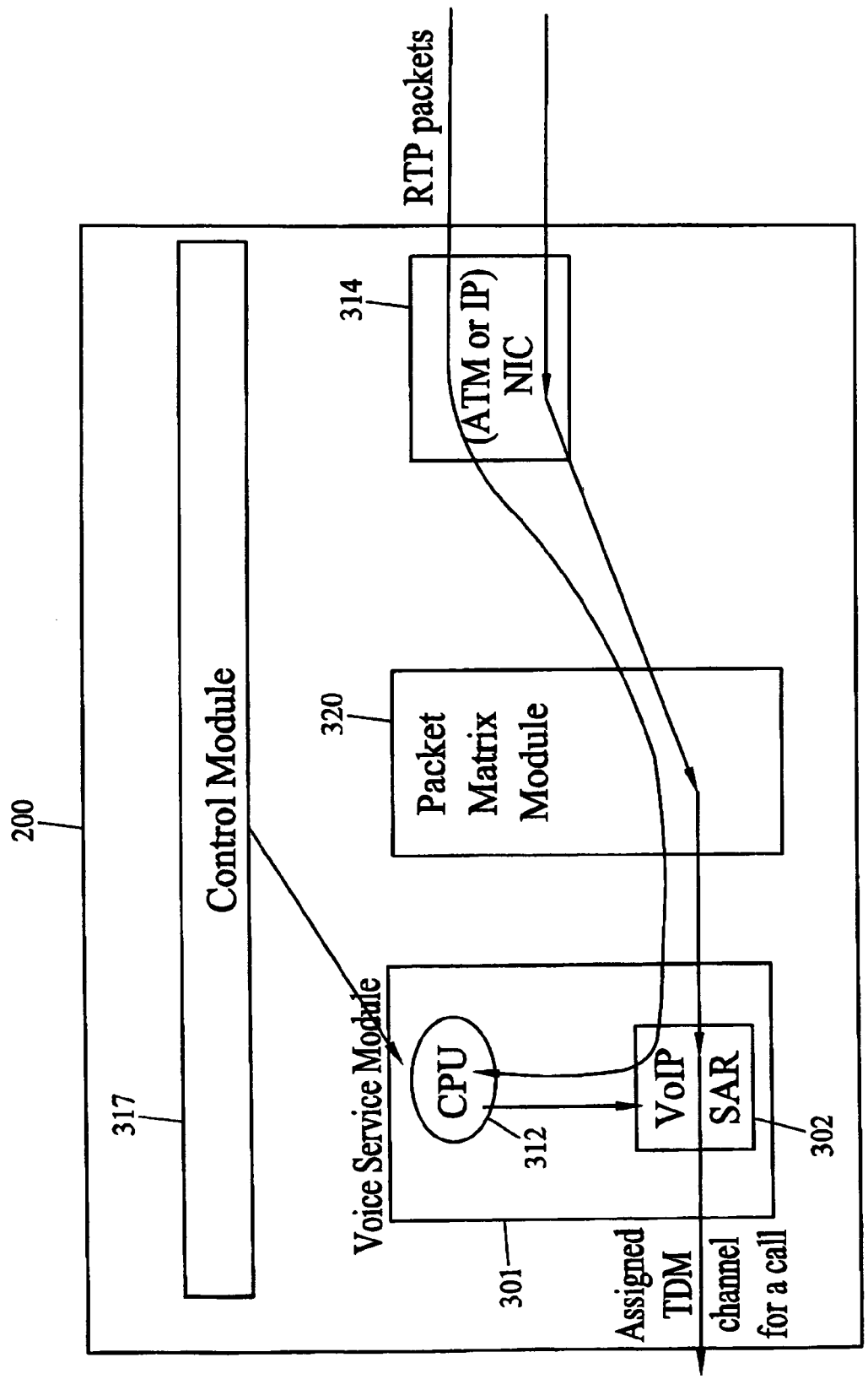
FIG. 6 is a media flow diagram illustrating exemplary NAT learning and firewall filtering on a voice server module for a voice-over-IP to TDM call according to an embodiment of the present invention.

FIG. 6 is a media flow diagram illustrating per-session NAT learning and firewall filtering on a voice server module 301 for a voice-over-IP to TDM call according to an embodiment of the present invention. Referring to FIG. 6, in order to perform NAT learning on voice server module 301, ATM or IP NIC 314 forwards the first RTP packet or first few received RTP packets of a session to the assigned voice-over-IP SAR chip 302 located on the assigned voice server module 301. As illustrated in FIG. 3, media gateway 200 may include a plurality of voice server modules 301. Voice server modules 301 may be a shared pool of resources that are dynamically assigned by control module 317 to new sessions.

The voice-over-IP SAR chip assigned to the session is initialized to forward all the received RTP packets for a call to CPU 312. CPU 312 learns the source public IP address and source UDP port from the first RTP packet or first few RTP packets of the session. After NAT learning, CPU 312 reconfigures voice-over-IP SAR chip to only accept RTP packets sent from the learned remote IP, learned remote UDP to the assigned local IP, UDP address combination. Thus, in the embodiment illustrated in FIG. 6, per-session NAT learning function is performed on CPU 312, and the per-session firewall-filtering function is performed by voice-over-IP SAR chip 302. Once the NAT learning has been performed, CPU 312 reconfigures voice-over-IP SAR chip 302 to reroute subsequently accepted RTP packets for the session to the TDM channel assigned for the session.

Figure 7:
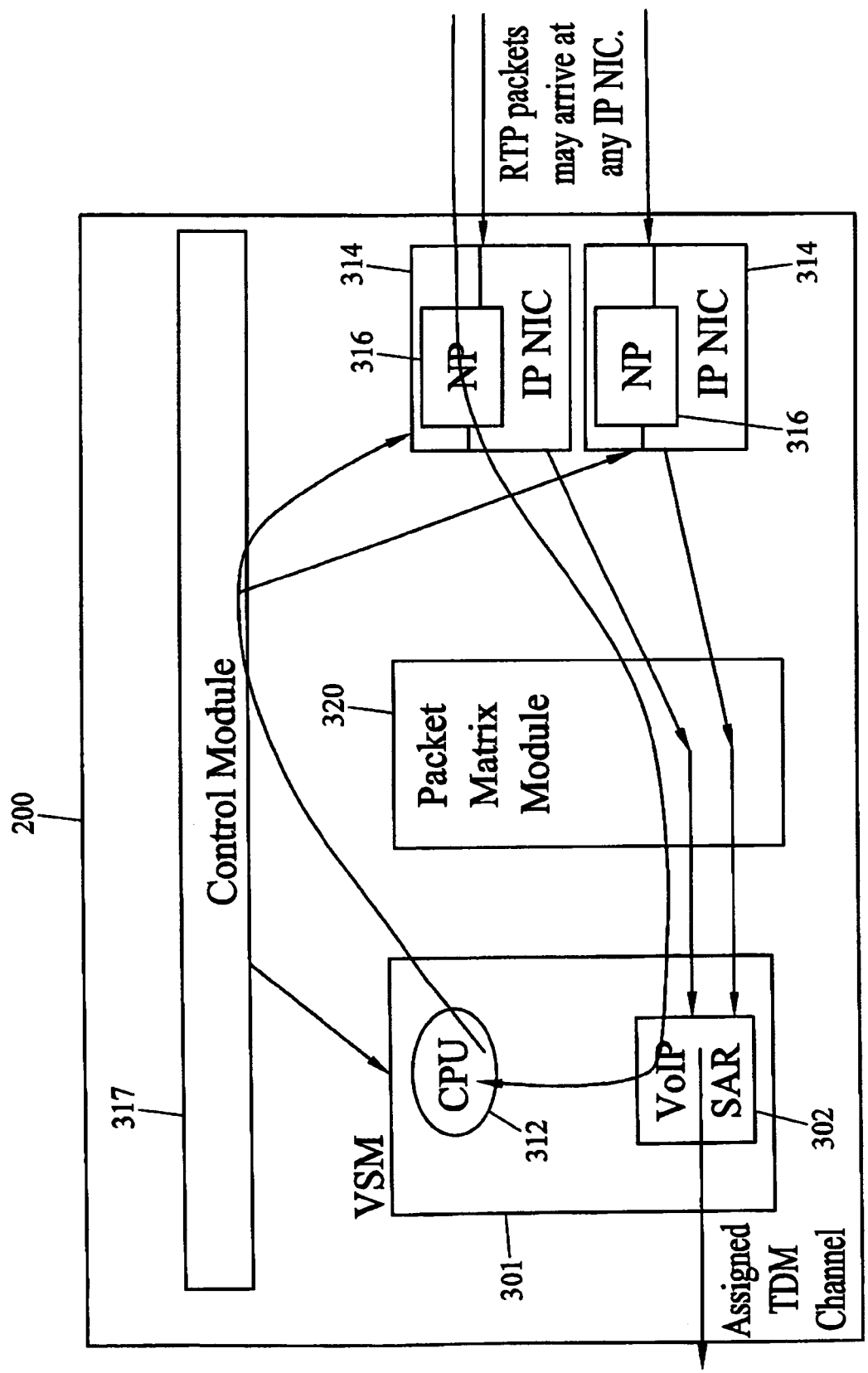
FIG. 7 is a media flow diagram illustrating exemplary NAT learning on a voice server module and firewall filtering on all IP NICs for a voice-over-IP to TDM call according to an embodiment of the present invention.

FIG. 7 illustrates an alternate embodiment of the invention in which NAT learning is performed on a voice server module and firewall filtering is performed on an IP NIC. Referring to FIG. 7, the first RTP packet for a session is sent from one of the IP NICs 314 to the voice-over-IP SAR chip 302 assigned to the session. Voice-over-IP SAR chip 302 routes the first received RTP packet addressed to the <local IP, local UDP> address combination assigned for the session to CPU 312. CPU learns the source public IP address and source UDP port by extracting these parameters from the first received RTP packet. CPU 312 reconfigures voice-over-IP SAR chip 302 to route accepted RTP packets over a TDM channel allocated for the call. However, rather than performing firewall filtering on voice-over-IP SAR chip 302, CPU 312 notifies the media gateway's control module 317 of the <learned remote IP address, learned remote UDP address> combination corresponding to the <local IP address, local UDP address> combination assigned to the session. Control module 317 broadcasts the learned remote IP, learned remote UDP, local IP, and local UDP address combination to selected IP NICs 314 or all IP NICs 314. IP NICs 314 then perform per-session firewall filtering based on the address combination received from control module 317.

Thus, in the embodiment illustrated in FIG. 7, NAT learning is performed on one of the voice server modules 301 and subsequent firewall filtering is performed on IP NICs 314 for a voice-over-IP to TDM call. Because the NAT learning and firewall filtering functions are separated, the solution illustrated in FIG. 7 is even more scalable with increasing session traffic.

Figure 8:
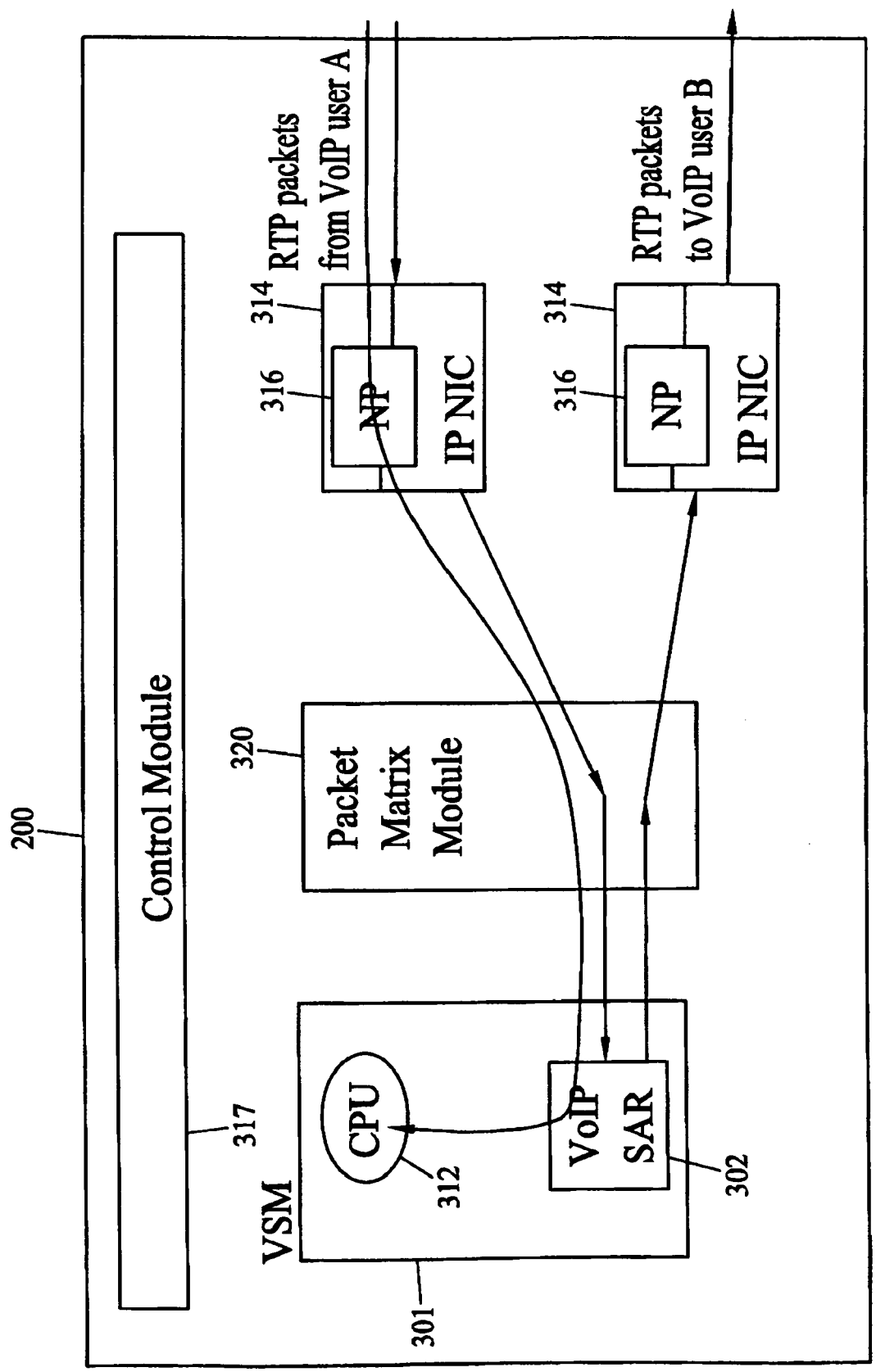
FIG. 8 is a media flow diagram illustrating exemplary NAT learning by a CPU on a voice server module for a voice-over-IP to voice-over-IP call according to an embodiment of the present invention.

FIG. 8 is a message flow diagram illustrating NAT learning on a voice server module for a voice-over-IP to voice-over-IP session. The steps for NAT learning and firewall filtering in FIG. 8 are similar to those illustrated in FIG. 7. That is, NIC cards 314 send RTP packets addressed to one of the allocated <local IP address, local UDP address> combinations to the voice-over-IP SAR chip assigned for the RTP flow. The voice-over-IP SAR chip routes the first received RTP packet addressed to its <local IP, local UDP> address combination to CPU 312, and CPU 312 performs NAT learning. CPU 312 then informs control module 317 of the learned remote addresses, and control module 317 broadcasts the address combination to some selected or all IP NICs 314. IP NICs 314 then filter RTP packets using the local and remote address combinations.

However, in contrast to the embodiment illustrated in FIG. 7, rather than reconfiguring voice-over-IP SAR chip 302 to send accepted packets to the assigned TDM channel, in FIG. 8, CPU 312 reconfigures voice-over-IP SAR chip 302 to reroute received RTP packets into the data buffer of the IP NIC corresponding to the next hop IP address for the voice-over-IP session. In the embodiment illustrated in FIG. 8, voice-over-IP SAR chips on voice server modules 301 are a resource pool and can be shared by all voice-over-IP to voice-over-IP sessions for the NAT learning function.

Figure 9:
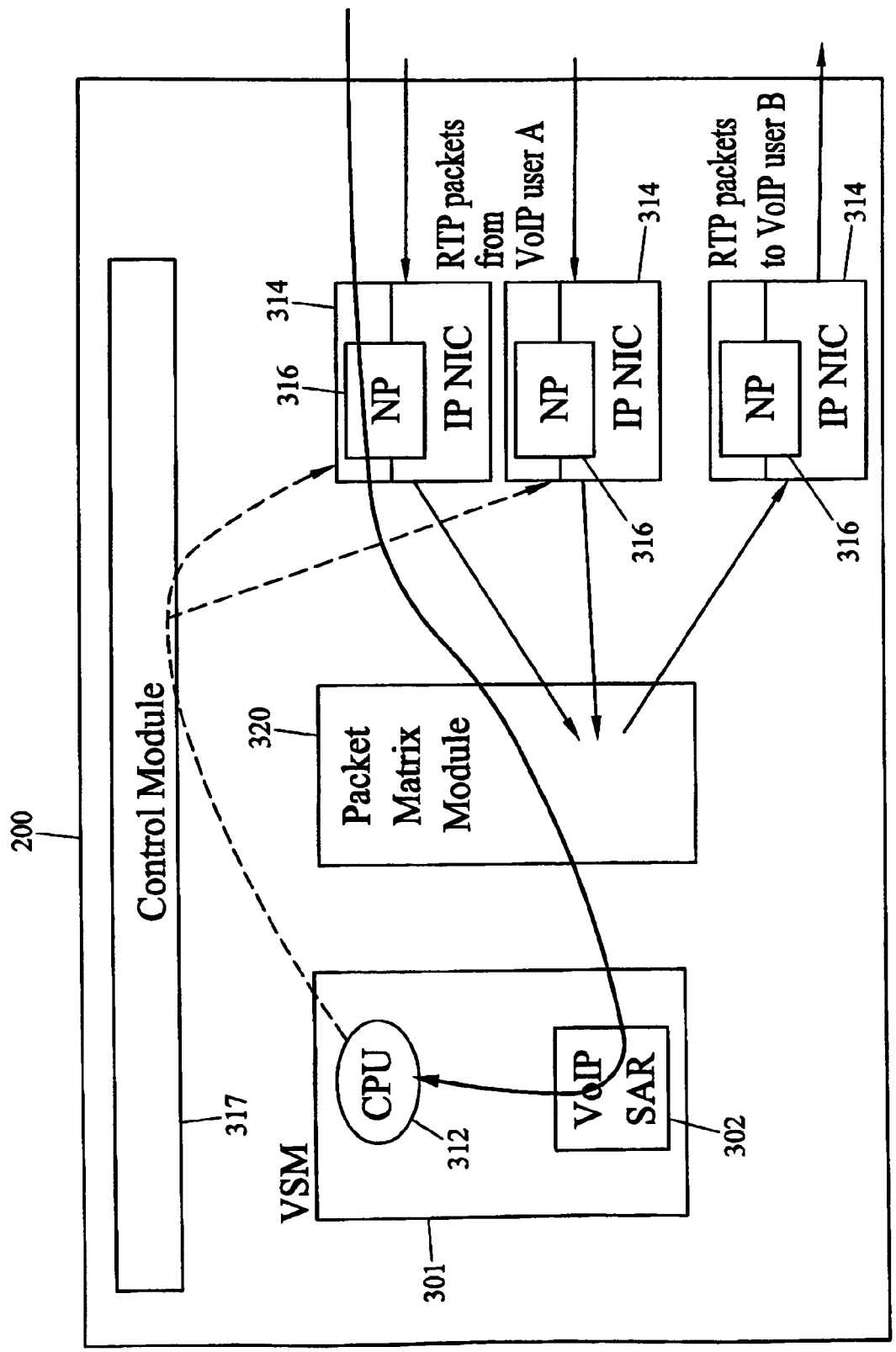
FIG. 9 is a media flow diagram illustrating exemplary pooling of voice-over-IP SAR chips for NAT learning to support voice-over-IP to voice-over-IP calls according to an embodiment of the present invention.

FIG. 9 is a message flow diagram illustrating the pooling of voice-over-IP SAR chips for NAT learning to support voice-over-IP to voice-over-IP calls according to an embodiment of the present invention. The method used by the architecture illustrated in FIG. 9 to perform per-session NAT learning and firewall filtering is similar to that illustrated in FIG. 8. That is, in FIG. 9, RTP packets from an incoming voice-over-IP session are received by IP NICs 314. IP NICs 314 route the first few media packets associated with each session for which a <local IP, local UDP> address combination has been assigned to the associated voice-over-IP SAR chip. The voice-over-IP SAR chip performs NAT learning, and informs CPU 312, CPU 312 informs control module 317, and control module 317 notifies IP NICs 314 of the remote <IP, UDP> address combination associated with each local <IP, UDP> address combination.

Unlike the example illustrated in FIG. 8 where it is assumed that transcoding or other processing is performed on voice server module 301, subsequent packets for each session after NAT learning are not routed to the voice-over-IP SAR chip in FIG. 9. Rather, the subsequent packets are routed from the incoming NIC to the outgoing NIC through packet matrix 320. That is, for accepted packets that do not require transcoding, each incoming NIC inserts the local IP and UDP addresses in the source address fields of each outgoing RTP packet and inserts the IP address and UDP port associated with the next hop in the VoIP path in the destination fields of each outgoing RTP packet. The IP NIC then routes the outgoing RTP packet to the IP NIC associated with the next voice-over-IP hop. For voice-over-IP to voice-over-IP calls without requiring transcoding functions, voice-over-IP SAR chips 302 do not have to be involved after NAT learning is performed. Thus, voice-over-IP SAR chips 302 can be shared as a dynamically managed resource pool for NAT learning purposes.

Figure 10:
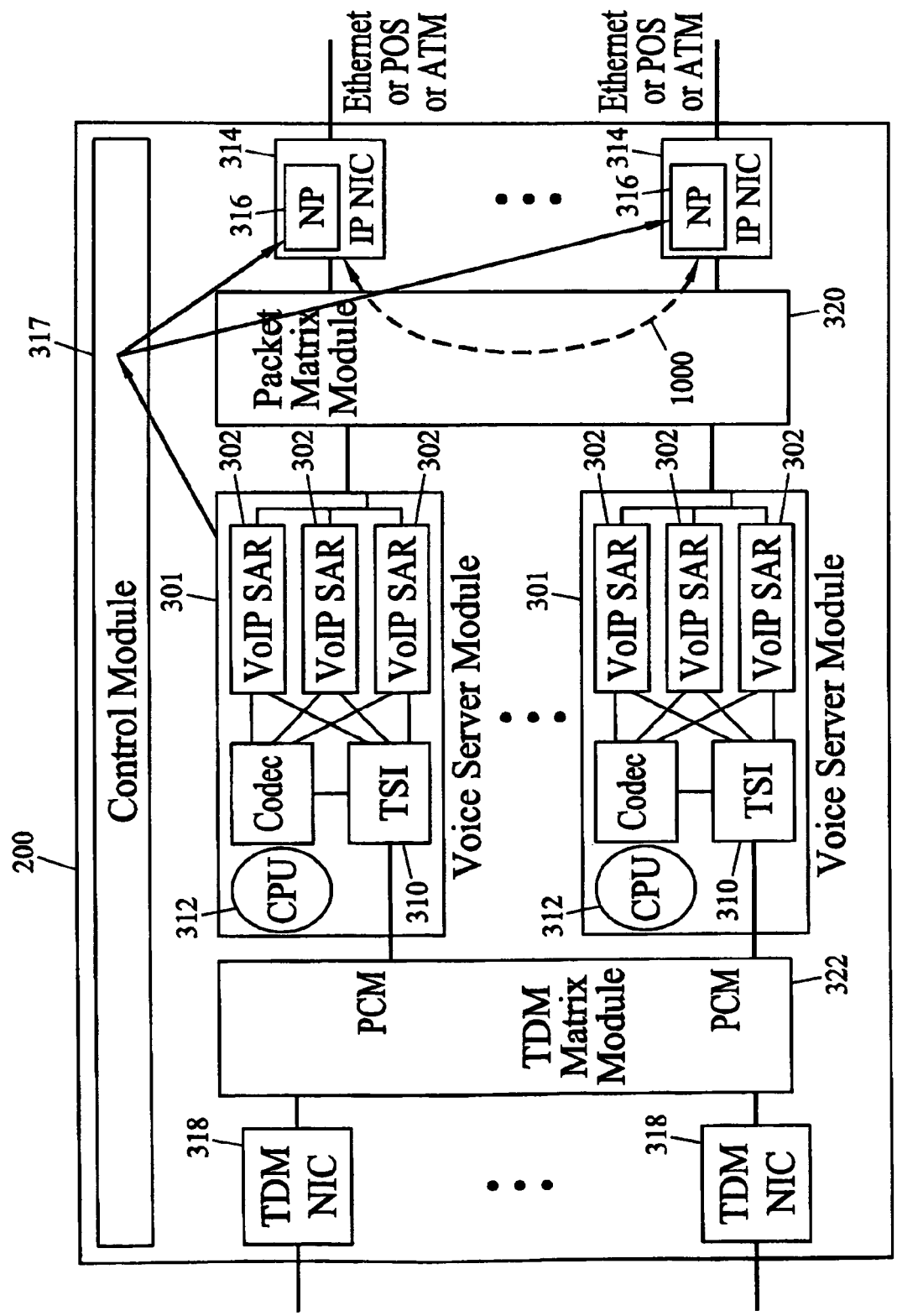
FIG. 10 is block diagram illustrating a media gateway and exemplary cut through between IP NICs after NAT learning on a voice-over-IP SAR chip according to an embodiment of the present invention.

FIG. 10 illustrates the media path associated with the NAT learning method illustrated in FIG. 9. In FIG. 10, after NAT learning, packets associated with an incoming media stream at one of IP NICs 314 are accepted if the packets match the <local IP, local UDP, remote IP, remote UDP> address combination assigned to a session. Once a packet is accepted, the receiving NIC inserts into the source IP and UDP address fields of each packet the local IP and UDP address of the next Voice-over-IP call hop. In the destination address fields of each packet, the receiving NIC inserts the remote IP address and UDP port of the next voice-over-IP call hop. The IP NIC then routes the packet to the outgoing IP NIC via packet interface 314, as indicated by dotted line 1000. Thus, in the example illustrated in FIG. 10, voice-over-IP SAR chips 302 are not impacted for processing voice-over-IP to voice-over-IP calls after NAT learning. As a result, the solution illustrated by FIG. 10 is scalable as the sizes and topologies of remote networks change.

Figure 11:
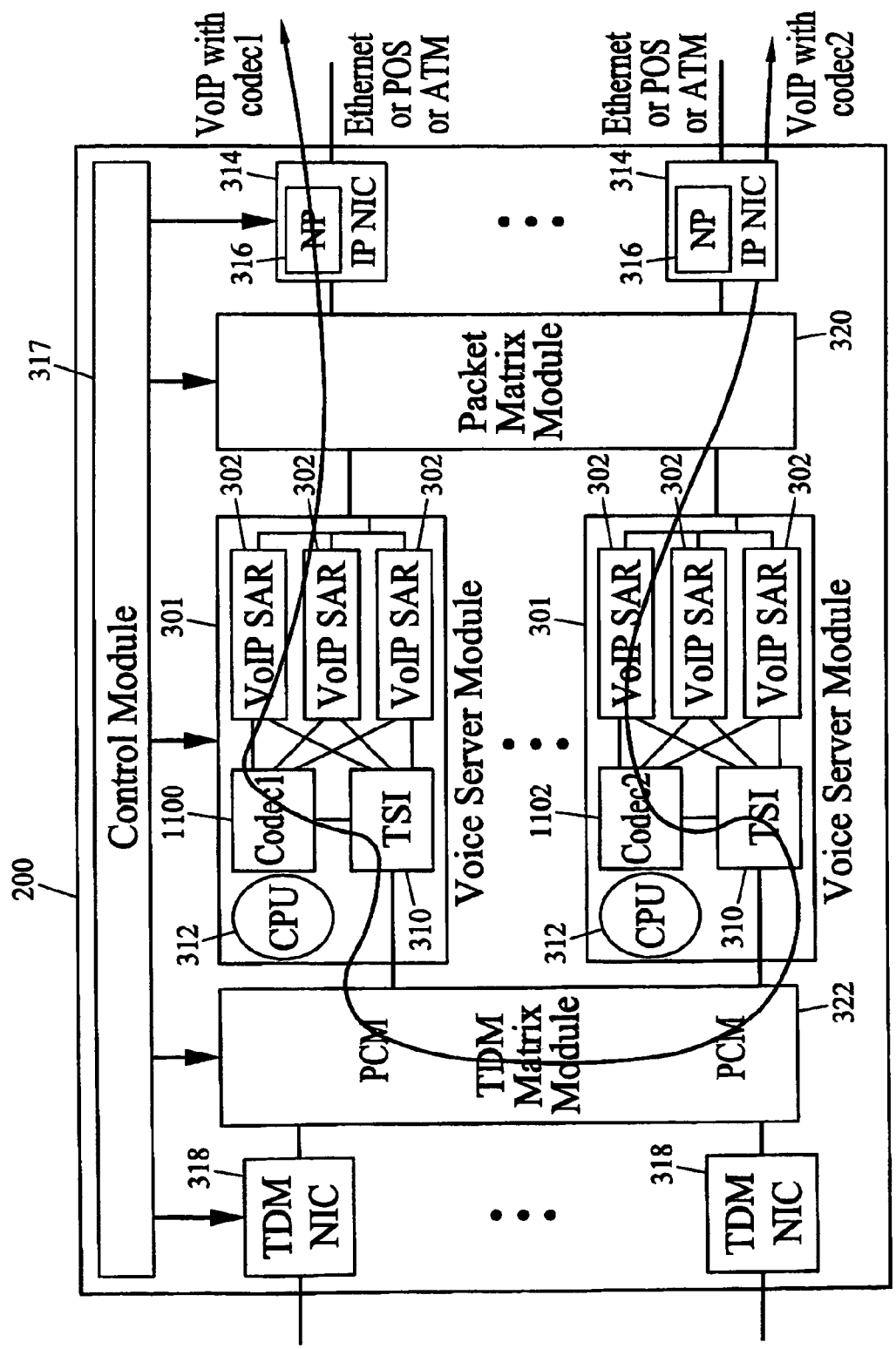
FIG. 11 is a block diagram illustrating transcoding for voice-over-IP to voice-over-IP calls according to an embodiment of the present invention.

FIG. 11 is a block diagram illustrating the media flow path for voice-over-IP to voice-over-IP calls with transcoding and per-session NAT learning according to an embodiment of the present invention. In the embodiment illustrated in FIG. 11, when the first few media packets associated with the voice-over-IP to voice-over-IP call for which transcoding is required arrives at one of IP NICs 314, the IP NIC forwards the first packet to the voice-over-IP SAR chip 302 assigned to the session. The receiving voice-over-IP SAR chip 302 performs NAT learning. CPU 312 on voice server module 301 then reconfigures the voice-over-IP SAR chip to route media packets to Codec1 1100. Codec1 1100 converts the RTP packets encoded from the codec on first call leg (e.g. G.726, G.729, AMR, etc.) to standard G.711, i.e., Pulse Code Modulated (PCM) encoding. The PCM media stream is then sent over TDM matrix module 312 to the outbound voice server module. Codec2 1102 on the outbound voice server module converts the PCM-encoded media stream into the codec of the second call leg. For example, Codec2 1102 may convert the media stream from G.711 encoding to G.729 encoding. After transcoding, the RTP packet is then routed via packet matrix module 320 to the IP NIC associated with the destination. Thus, the present invention is capable of performing NAT learning on a per-session basis for voice-over-IP to voice-over-IP calls where transcoding is performed.

Figure 12:
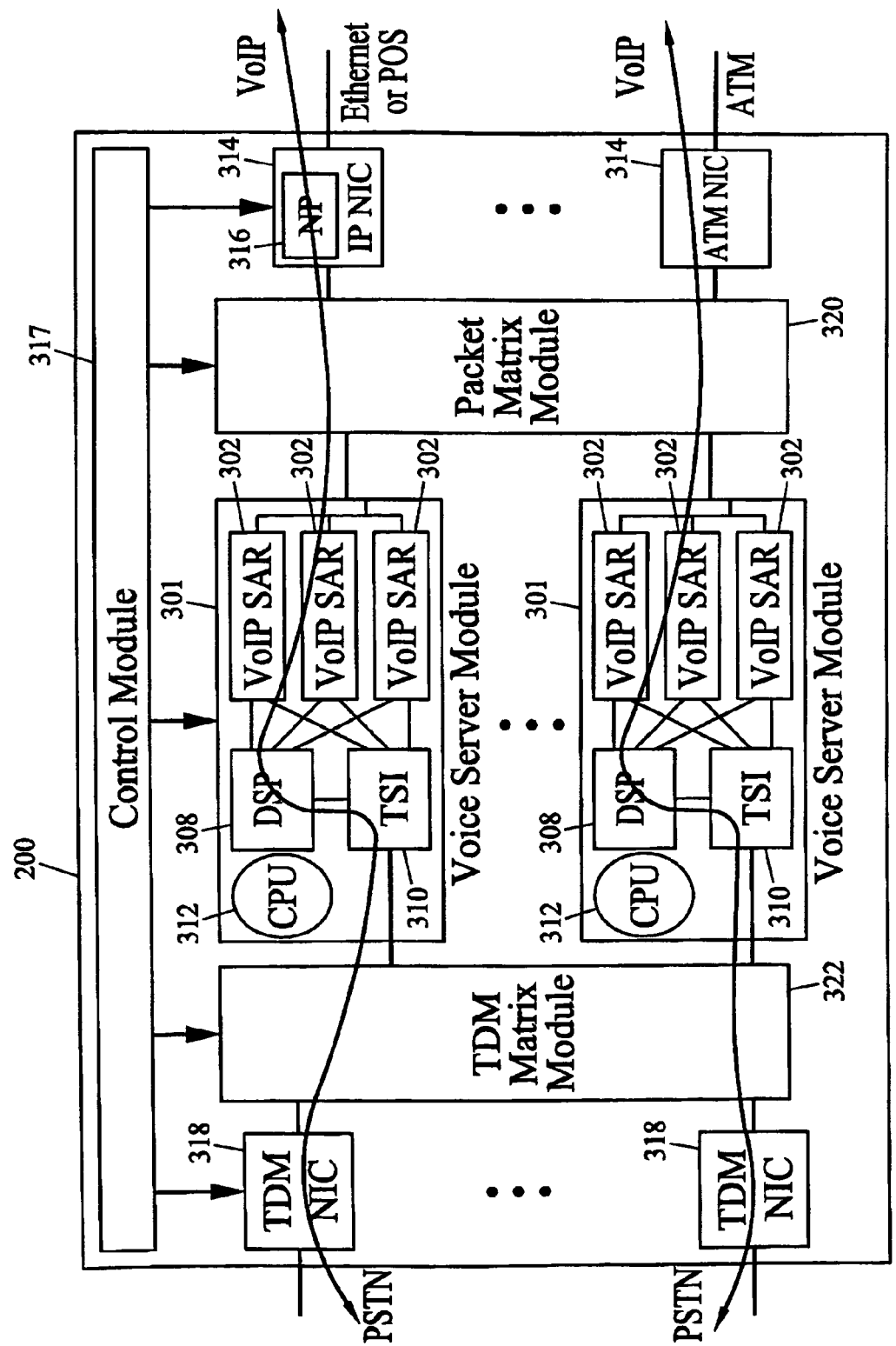
FIG. 12 is a block diagram illustrating a media gateway for processing voice-over-IP to PSTN calls according to an embodiment of the present invention.

FIG. 12 is a block diagram illustrating exemplary media flows for voice-over-IP to PSTN calls with per-session NAT learning and firewall filtering according to an embodiment of the present invention. Referring to FIG. 12, for incoming voice-over-IP calls, NAT learning may occur on CPU 312 or voice SAR chips 302, as described above. Once NAT learning is performed, each IP or ATM NIC 314 accepts subsequent packets that correspond to an assigned session and routes the subsequent packets to the assigned voice-over-IP SAR chip. The packets then proceed through DSP 308 and TSI 310 where the packets are converted to a TDM media stream. The TDM media stream then is routed over TDM matrix module 322 and TDM NICs 318 to the PSTN destination.

Figure 13:
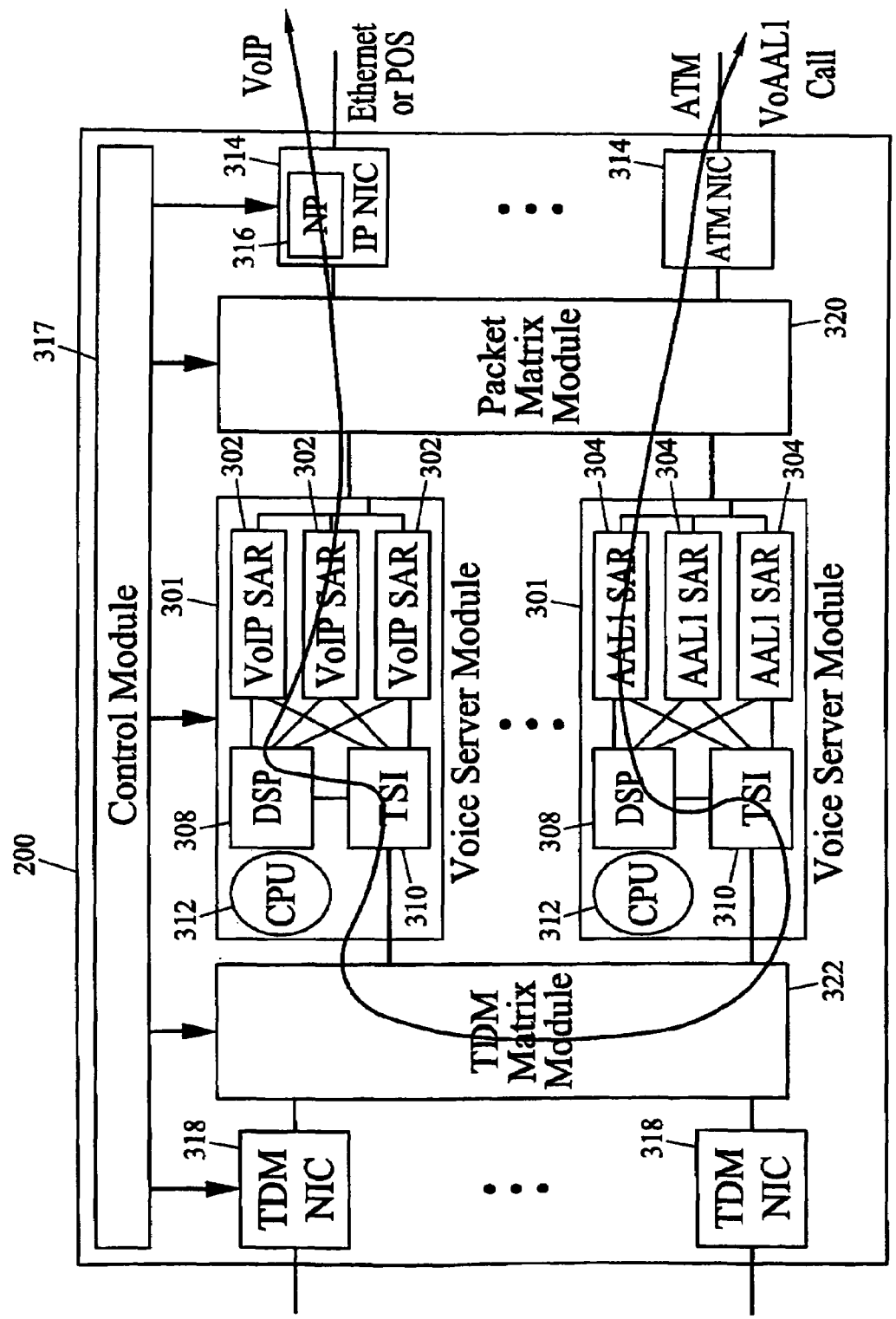
FIG. 13 is block diagram illustrating a media gateway including support for voice-over-IP to voice-over-AAL1 calls according to an embodiment of the present invention.

FIG. 13 illustrates a media flow for voice-over-IP to voice-over-AAL1 calls with NAT learning according to an embodiment of the present invention. In FIG. 13, incoming RTP packets from a voice-over-IP terminal are received at IP NIC 314. IP NIC 314 filters the packets based on the locally assigned source and destination IP address combination. If IP NIC 314 accepts the packets, IP NIC 314 routes the packets to the appropriate voice-over-IP SAR chip for NAT learning. Voice-over-IP SAR chip 302 performs NAT learning and routes the PCM stream via TDM matrix module 322 to the outbound voice server module 301. The outbound voice server module converts the PCM stream into an AAL1 cell stream and sends the cells to the external network via ATM NIC 314. Transcoding is not needed for the voice-over-AAL1 call leg, but the DSP may be needed to perform echo cancellation and other functions.

Figure 14:
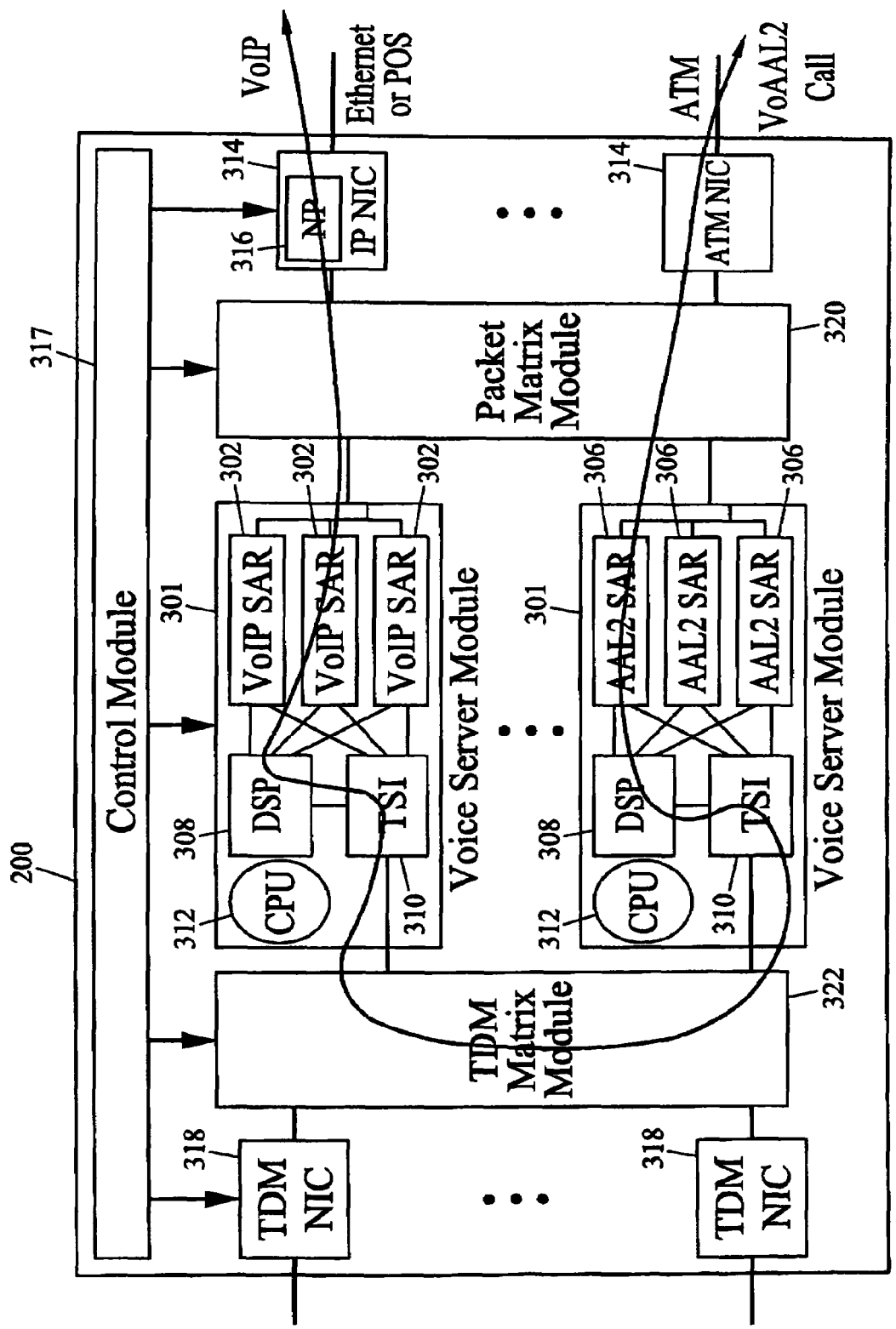
FIG. 14 is a block diagram of a media gateway including support for voice-over-IP to voice-over-AAL2 calls according to an embodiment of the present invention.

FIG. 14 illustrates a media flow for voice-over-IP to voice-over-AAL2 calls with NAT learning according to an embodiment of the present invention. In FIG. 14, incoming RTP packets from a voice-over-IP terminal are received at IP NIC 314. IP NIC 314 initially filters the packets based on the locally assigned source and destination IP address combination. If IP NIC 314 accepts the packets, IP NIC 314 routes the packets to the appropriate voice-over-IP SAR chip for NAT learning. Voice-over-IP SAR chip 302 performs NAT learning and routes the packet-s of a session into DSP 308 for possible transcoding. The transcoding function may or may not be needed in VoIP-to-VoAAL2 calls, both of which are supported according to embodiments of the present invention. If transcoding is needed, DSP 308 decodes media packets into PCM samples, and sends the packets via TDM matrix 322 to the outbound voice server module. If transcoding is not needed, DSP 308 is bypassed and native media packets are sent directly from VoIP SAR 301 via TDM matrix 322 to the outbound voice server module. The outbound voice server module converts the PCM samples or the native media packets into an AAL2 cell stream and sends the cells to the external network via ATM NIC 314.

Figure 15:
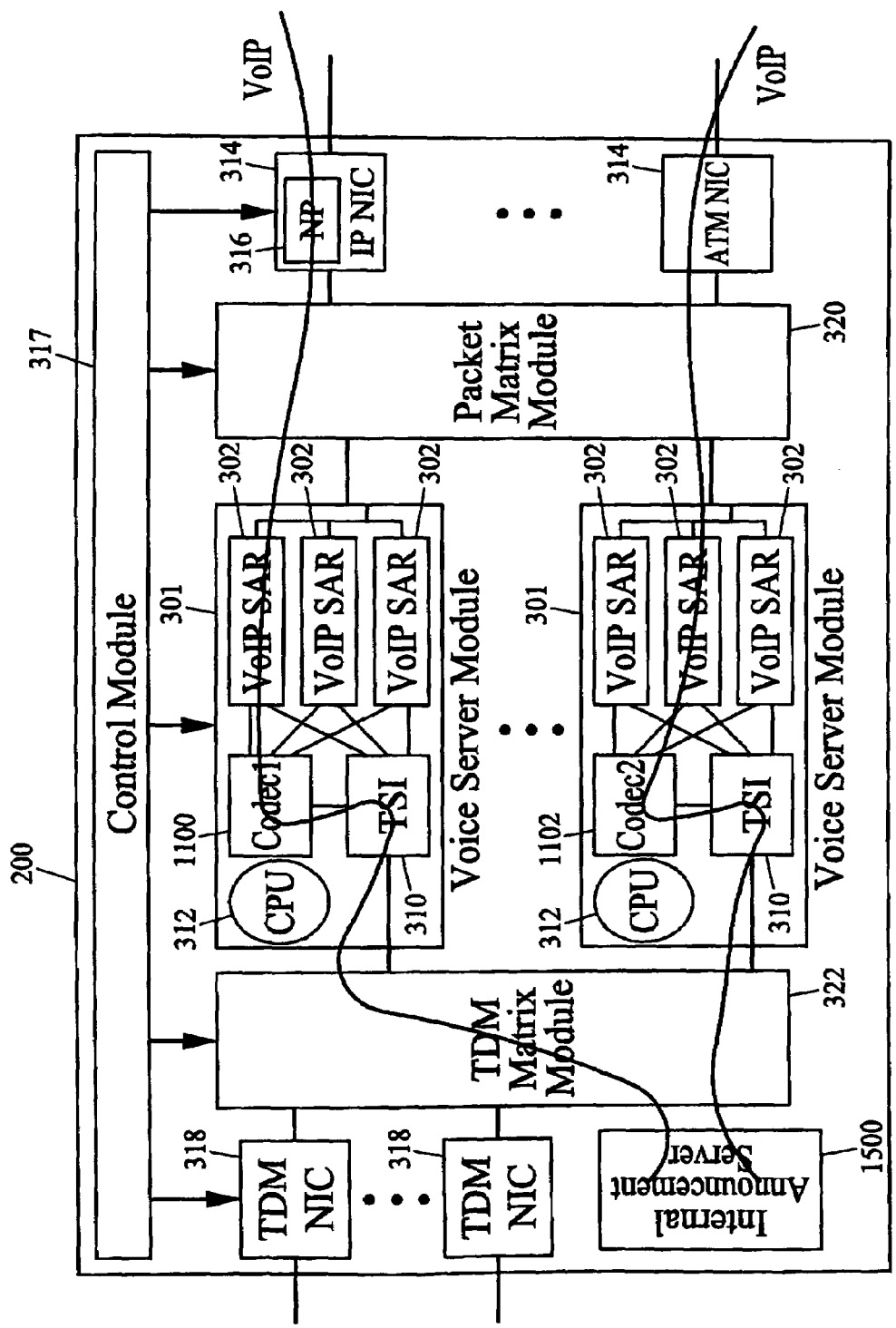
FIG. 15 is a block diagram of a media gateway configured for seamless insertion of an internal announcement server according to an embodiment of the present invention.

FIG. 15 is a block diagram of a media gateway illustrating seamless insertion of an internal announcement server according to an embodiment of the present invention. Insertion of an announcement server may occur during any time of a call, e.g., during call setup, during active stage, during call release. In FIG. 15, it is assumed that NAT learning is performed by a voice-over-IP SAR chip for the first received RTP packet in the manner described above. After NAT learning, the voice-over-IP SAR chip routes the message via DSP 1100, TSI 310, and TDM matrix module 322 to an internal announcement server 1500. Internal announcement server 1500 generates an announcement media stream. The announcement media stream is sent via TDM matrix module 322, TSI 310, and DSP 1100 to the voice-over-IP SAR chip associated with the outbound media stream. The voice-over-IP SAR chip associated with the outbound media stream forwards the media stream back to IP NIC 314 associated with the destination. The internal announcement server in FIG. 15 may be replaced with any other type of media server, e.g., a DTMF detector, a DTMF generator, a conference bridge, a voice mail server, a law enforcement circuit, without departing from the scope of the invention.

One advantage of the scheme illustrated in FIG. 15 is that the internal media processing servers (e.g. announcement server, DTMF collectors, DTMF generators, conference bridges, voice recorders, law enforcement circuits) can be inserted without affecting the call topology. For example, for announcement server insertion, the terminal at the remote end of the connection is not required to listen to multiple RTP media streams (i.e., media streams other than the media stream initially established for the call during call setup) in order to receive an announcement. All that the remote terminal is required to do is to listen as normal on the RTP media stream initially set up with media gateway 200. Thus, by providing seamless insertion of an internal announcement server after NAT learning, a media gateway of the present invention decreases the complexity and intelligence required of remote communication terminals.

Figure 16:
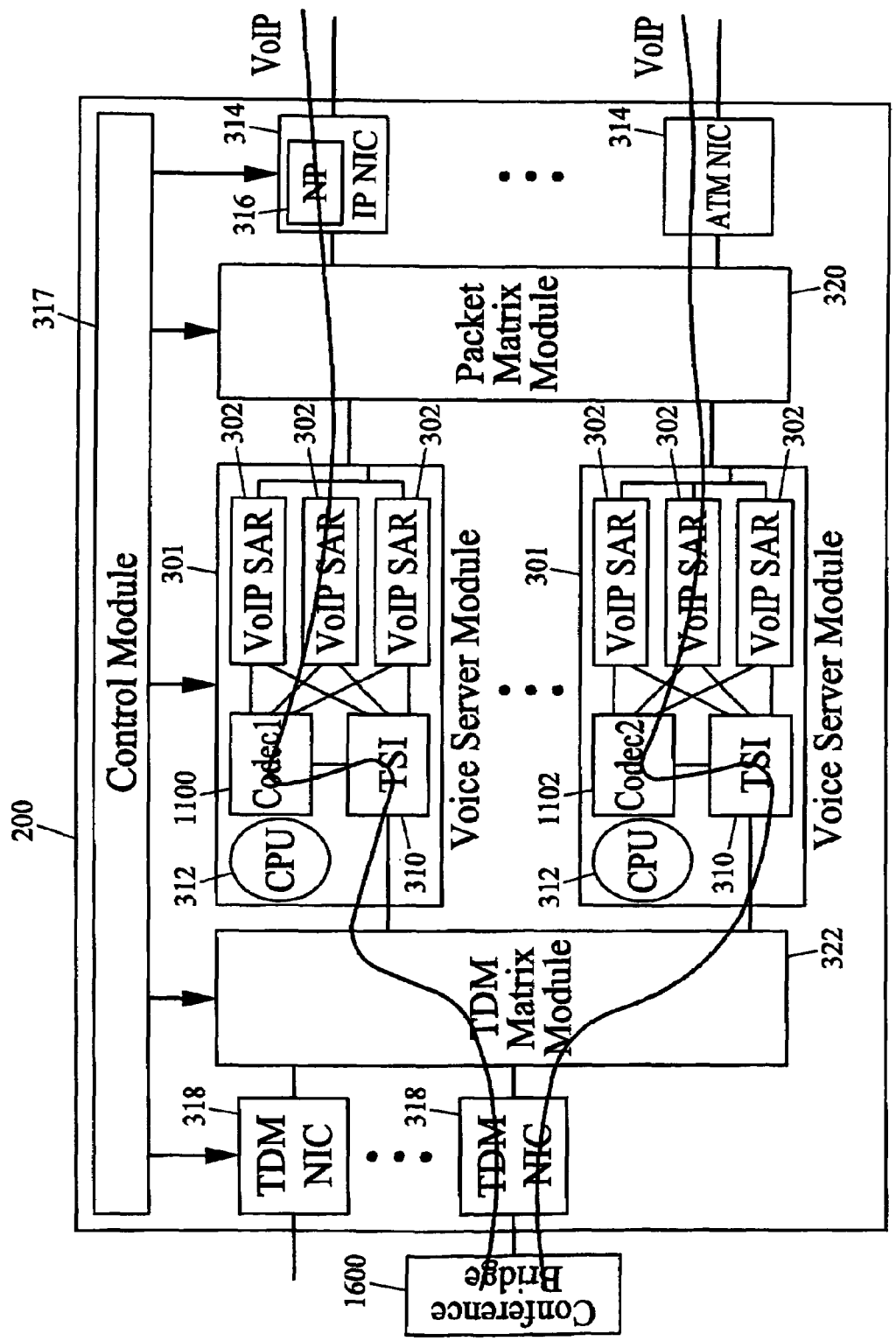
FIG. 16 is a block diagram of a media gateway configured for seamless insertion of an external conference bridge according to an embodiment of the present invention.

FIG. 16 is a block diagram of a media gateway illustrating seamless insertion of an external TDM conference bridge according to an embodiment of the present invention. In FIG. 16, voice-over-IP packets arrive at an IP NIC and are routed to the voice-over-IP SAR chip associated with the session. Voice-over-IP SAR chip 302 maps the packets into the assigned TDM channel, Codec1 1100 translates media packets into a PCM stream and sends it via TSI 310, TDM matrix module 322, and TDM NIC 318 to an external conference bridge 1600. Conference Bridge 1600 may connect the incoming media stream with one or more outbound TDM and/or IP media streams. In this example, the outbound media stream is an IP media stream. Accordingly, the inbound PCM samples may be forwarded via TDM NIC 318, TDM matrix module 322, TSI 310, and Codec2 1102 to voice-over-IP SAR chip 302 associated with the outbound media stream. Voice-over-IP SAR chip 302 routes the packet to the outbound NIC 314 associated with the destination of the session. Like the internal announcement server, external conference bridge 1600 can be inserted without changing the call topology seen by remote VoIP terminals. That is, there is no need to perform call signaling to inform any remote terminal to listen on multiple IP addresses or UDP ports for media communications. All that is required is that each remote terminal listens on the original destination <IP, UDP> address combination assigned to the session. As a result, the complexity of external devices is reduced. The external conference bridge server in FIG. 16 may be replaced with any other type of media server, e.g., DTMF detector, DTMF generator, announcement server, voice mail server, law enforcement circuit, without departing from the scope of the invention.

Thus, as described above, the present invention includes methods and systems for per-session NAT learning and firewall filtering in a media gateway. Because NAT learning and firewall filtering are performed on a per-session basis, security is increased and reachability problems associated with network address translators are solved. In addition, because these functions are performed internally within a media gateway, the need for external session controllers is avoided. Integrated NAT learning also allows seamless insertion of other media processing devices, such as announcement servers and conference bridges, without affecting the voice-over-IP call topology. Another advantage of the present invention over conventional session-controller-based NAT learning is that in the present invention, NAT learning may be distributed. That is, NAT learning for each new incoming session may be performed using a resource that is dynamically allocated from a shared pool of resources.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for per-session network address translation (NAT) learning in a media gateway, the method comprising: in the media gateway:
   (a) receiving a media session setup request for establishing a media session in which media packets are exchanged between communicating entities;
   (b) in response to the media session setup request, assigning a local network and transport address combination identifying a media processing resource within the media gateway for processing the media packets associated with the media session;
   (c) receiving at least one initial media packet of the media packets exchanged between the communicating entities in the media session, the at least one initial media packet being addressed to the local network and transport address combination and having a source network address and a source transport address, each of the source network address and the source transport address being a NAT-translated address assigned by a network address translator;
   (d) learning the NAT-translated source network address and the NAT-translated source transport address from the at least one initial media packet;
   (e) processing the at least one initial media packet using the media processing resource assigned to the media session;
   (f) accepting and processing subsequent media packets having the assigned local network address and local transport address in their destination address fields and the learned source network address and the learned source transport address in their source address fields; and
   (g) repeating steps (a)-(f) for each new incoming session to the media gateway and thereby performing NAT learning on a per-session basis.

2. The method of claim 1 wherein receiving the media session setup request includes receiving a request from a soft switch to allocate resources for a new media session.

3. The method of claim 1 wherein the media session comprises at least one voice call.

4. The method of claim 1 wherein the media stream session comprises a Real-time Transmission Protocol (RTP) media stream.

5. The method of claim 1 wherein assigning the local network and transport address combination includes assigning the local network and transport address combination to a media processing chip for processing the media session.

6. The method of claim 1 wherein learning the NAT-translated source network address includes:

(a) receiving the at least one initial media packet at the media processing resource;
(b) routing the at least one initial media packet from the media processing resource to a central processing unit (CPU) operatively associated with the media processing resource; and
(c) at the CPU, extracting the NAT-translated source network address from the at least one initial media packet and thereby learning the NAT-translated source network address and broadcasting the learned source network address to a plurality of network interface cards in the media gateway.

7. The method of claim 6 comprising extracting the NAT-translated source transport address from the at least one initial media packet and thereby learning the NAT-translated source transport address and broadcasting the learned source transport address to the plurality of network interface cards in the media gateway.

8. The method of claim 7 comprising, at the plurality of network interface cards, using the learned source network address, the learned source transport address, the local network address, and the local transport address to create a per-session pin-hole for firewall filtering.

9. The method of claim 1 wherein learning the NAT-translated source network address includes dynamically assigning one of a plurality of distributed media processing elements in the media gateway to learn the NAT-translated source network address.

10. The method of claim 1 wherein learning the NAT-translated source network address includes:
(a) receiving the at least one initial media packet at the media processing resource; and
(b) at the media processing resource, extracting the NAT-translated source network address and thereby learning the NAT-translated source network address and broadcasting the learned source network address to a plurality of network interface cards in the media gateway.

11. The method of claim 10 comprising broadcasting the learned source transport address to the plurality of network interface cards in the media gateway.

12. The method of claim 11 comprising, at the plurality of network interface cards, using the learned source network address, the learned source transport address, the local network address, and the local transport address to create a per-session pin-hole for firewall filtering.

13. The method of claim 10 wherein the media session comprises a voice-over-IP-to-voice-over-IP media stream and wherein accepting and processing subsequent media packets associated for the media session includes receiving subsequent media packet associated with the media session at a first network interface card, determining a destination network interface card based on a destination address, and forwarding all the subsequent media packets to the selected destination network interface card.

14. The method of claim 1 comprising, after step (d), performing firewall filtering for the subsequent media packets using the local network address, the local transport address, the NAT-translated source network address, and the NAT-translated source transport address.

15. The method of claim 14 wherein performing firewall filtering includes rejecting media packets that have the local network address and the local transport address in their destination address fields but do not have the NAT-translated source network address and the NAT-translated source transport address in their source address fields.

16. The method of claim 1 wherein the media session comprises a voice call and wherein the method further comprises seamlessly inserting an internal media processor into the voice call without changing topology of the voice call during any time of the voice call, including call initialization time, call active state, and call release time.

17. The method of claim 16 wherein inserting the internal media processor into the voice call includes inserting at least one of: an announcement server, a conference bridge, a DTMF generator, a DTMF collector, a voice mail server, and a law enforcement circuit into the voice call.

18. The method of claim 1 wherein the media session comprises a voice call and wherein the method further comprises comprising seamlessly inserting an external media processor into the voice call without changing topology of the voice call for the duration of the voice call, including call initialization time, call active state, and call release time.

19. The method of claim 18 wherein inserting the external media processor into the voice call includes inserting at least one of: an announcement server, a conference bridge, a DTMF generator, a DTMF collector, a voice mail server, and a law enforcement circuit into the voice call.

20. A media gateway with internal network address translation (NAT) learning capabilities, the media gateway comprising:
(a) a plurality of network interface cards for receiving media packets exchanged between communicating entities in media sessions, for determining whether the media packets have been assigned to a session, and for forwarding the media packets that have been assigned to the session to a media processing resource;
(b) a plurality of media processing resources for processing the media packets that have been assigned to sessions, the plurality of media processing resources being assigned to the media sessions based on media session setup requests, wherein, when a media session setup request is received, a local network and transport address combination identifying the media processing resource in the media gateway for processing media packets associated with the session is assigned to the session; and
(c) a NAT learning function located within the media gateway and operatively associated with the media processing resources and the plurality of network interface cards for learning, from at least one initial media packet of the media packets exchanged between communicating entities in each session, NAT-translated source network addresses and NAT-translated source transport addresses assigned by a network address translator to the media packets and for communicating the learned source network and transport addresses to the network interface cards.

21. The media gateway of claim 20 wherein the plurality of network interface cards comprise packet network interface cards.

22. The media gateway of claim 20 wherein the plurality of network interface cards comprise ATM network interface cards.

23. The media gateway of claim 20 wherein the plurality of media processing resources include voice-over-IP SAR chips for processing voice-over-IP calls.

24. The media gateway of claim 23 wherein the NAT-learning function is performed by the voice-over-IP SAR chips.

25. The media gateway of claim 24 comprising a plurality of voice server modules associated with the voice-over-IP SAR chips, a central processing unit located on each voice server module for controlling the voice-over-IP SAR chips, wherein the NAT learning function is performed by one of the central processing units that is dynamically assigned to the session.

26. The media gateway of claim 20 wherein the plurality of media processing resources include a first codec and a second codec and wherein the first codec and the second codec are used to perform transcoding for at least one of voice-over-IP to voice-over-IP calls, voice-over-IP to voice-over-AAL1 calls and voice-over-IP to voice-over-AAL2 calls.

27. The media gateway of claim 20 wherein the NAT learning function is adapted to distribute the learned source network addresses and the learned source transport addresses to at least one of the plurality of network interface cards and wherein the plurality of network interface cards are adapted to accept media packets addressed to the local network address and the local transport address, the learned source network address, and the learned source transport address assigned to the session.

28. The media gateway of claim 27 wherein the plurality of network interface cards are adapted to reject media packets addressed to the local source network address and local source transport address assigned to the session but that do not have the learned source network address and learned source transport address assigned to the session.

29. The media gateway of claim 20 wherein the NAT learning function is adapted to selectively filter media packets for each session based on the local network address, the local transport address, the learned source address, and the learned transport address assigned to each session, thereby performing firewall filtering on a per-session basis.

30. A computer program product for per-session network address translation (NAT) learning in a media gateway, the computer program product comprising computer executable instructions embodied in a computer readable medium for performing steps comprising:

in the media gateway:
(a) receiving a media session setup request for establishing a media session in which media packets are exchanged between communicating entities;
(b) in response to the media session setup request, assigning a local network and transport address combination identifying a media processing resource within the media gateway for processing the media packets associated with the media session;
(c) receiving at least one initial media packet of the media packets exchanged between the communicating entities in the media session, the at least one initial media packet being addressed to the local network and transport address combination, the at least one initial media packet having a source network address and a source transport address, each of the source network address and the source transport address being a NAT-translated address assigned by a network address translator;
(d) learning the NAT-translated source network address and the NAT-translated source transport address from the at least one initial media packet;
(e) processing the at least one initial media packet using the media processing resource assigned to the media session;
(f) accepting and processing subsequent media packets having the local network address and local transport address in their destination address fields and the learned source network address and the learned source transport address in their source address fields; and (g) repeating steps (a)-(f) for each new session to the media gateway and thereby performing NAT learning on a per-session basis.

31. The computer program product of claim 30 wherein receiving the media session setup request includes receiving a request for allocating resources for a new media session from a soft switch.

32. The computer program product of claim 30 wherein the media session comprises a voice call.

33. The computer program product of claim 30 wherein the media session comprises a Real-time Transmission Protocol (RTP) media stream.

34. The computer program product of claim 30 wherein the media session comprises a Real-time Transmission Control Protocol (RTCP) media stream.

35. The computer program product of claim 30 wherein assigning the local network and transport address combination includes assigning the local network and transport address combination to a media processing chip for processing the media session.

36. The computer program product of claim 30 wherein learning the NAT-translated source network address includes:
(a) receiving the at least one initial media packet at the media processing resource;
(b) routing the at least one initial media packet from the media processing resource to a central processing unit (CPU) operatively associated with the media processing resource; and
(c) at the CPU, extracting the NAT-translated source network address from the at least one initial media packet and thereby learning the NAT-translated source network address and broadcasting the learned source network address to a plurality of network interface cards in the media gateway.

37. The computer program product of claim 36 comprising extracting the NAT-translated source transport address from the at least one initial media packet and thereby learning the NAT-translated source transport address and broadcasting the learned source transport address to the plurality of network interface cards in the media gateway.

38. The computer program product of claim 37 comprising, at the plurality of network interface cards, using the learned source network address, the learned source transport address, the local network address, and the local transport address to create a per-session pin-hole for firewall filtering.

39. The computer program product of claim 30 wherein learning the NAT-translated source network address includes:
(a) receiving the at least one initial media packet at the media processing resource; and
(b) at the media processing resource, extracting the NAT-translated source network address from the at least one initial media packet and thereby learning the NAT-translated source network address and broadcasting the learned source network address to a plurality of network interface cards in the media gateway.

40. The computer program product of claim 39 comprising broadcasting the learned source transport address to the plurality of network interface cards in the media gateway.

41. The computer program product of claim 40 comprising, at the plurality of network interface cards, using the learned source network address, the learned source transport address, the local network address, and the local transport address to create a per-session pin-hole for firewall filtering.

42. The computer program product of claim 39 wherein the media session comprises a voice-over-IP-to-voice-over- IP media stream and wherein accepting and processing subsequent media packets includes receiving subsequent media packets associated with the media session at a first network interface card, determining a destination network interface card based on a destination address in the subsequent media packets, and forwarding the subsequent media packets to the selected destination network interface card.

43. The computer program product of claim 42 wherein accepting and processing subsequent media packets include performing transcoding for the media packets.

44. The computer program product of claim 42 wherein accepting and processing subsequent media packets includes forwarding the subsequent media packets to the selected destination interface card without performing transcoding.

45. The computer program product of claim 36 comprising, after step (c), performing firewall filtering for the subsequent media packets associated with each session using the local network address, the local transport address, the learned source network address, and the learned source transport address.

46. The computer program product of claim 45 wherein performing firewall filtering includes rejecting media packets that have the local network address and the local transport address in their destination address fields but do not have the learned source network address and the learned source transport address in their source address fields.

47. The computer program product of claim 30 wherein the media session comprises a voice call and wherein the computer program product further performs the step of seamlessly inserting an internal media processor into the voice call without changing topology of the voice call during any time of the voice call, including call initialization time, active state, and call release time.

48. The system of claim 47 wherein seamlessly inserting the internal media processor into the voice call includes seamlessly inserting at least one of: an announcement player, a conference bridge, a DTMF generator, a DTMF collector, a voice mail server, and a law enforcement circuit into the voice call.

49. The computer program product of claim 30 wherein the media session comprises a voice call and wherein the computer program product further performs the step of seamlessly inserting an external media processor into the voice call without changing topology of the voice call during any time of the voice call, including call initialization time, active state, and call release time.

50. The system of claim 49 wherein seamlessly inserting the external media processor into the voice call includes seamlessly at least one of: an announcement player, a conference bridge, a DTMF generator, a DTMF collector, a voice mail server, and a law enforcement circuit into the voice call.

* * * * *